(12) United States Patent
Ryu et al.

(10) Patent No.: US 8,955,014 B2
(45) Date of Patent: Feb. 10, 2015

(54) METHOD AND APPARATUS FOR BROWSING BROADCAST PROGRAMS USING DYNAMIC USER INTERFACE

(75) Inventors: Sung-ho Ryu, Suwon-si (KR);
Yong-sung Kim, Suwon-si (KR);
Tae-ung Jung, Suwon-si (KR);
Dong-hyun Roh, Suwon-si (KR);
Hee-seon Park, Seoul (KR); Hye-Soo Lee, Seoul (KR); So-hee Jang, Seoul (KR); Chang-hwan Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1224 days.

(21) Appl. No.: 11/717,641

(22) Filed: Mar. 14, 2007

(65) Prior Publication Data
US 2007/0300257 A1   Dec. 27, 2007

(30) Foreign Application Priority Data

Jun. 21, 2006 (KR) .......................... 10-2006-0055915

(51) Int. Cl.
*H04N 5/445* (2011.01)
*G06F 3/00* (2006.01)
(Continued)

(52) U.S. Cl.
CPC ....... *H04N 5/44543* (2013.01); *H04N 21/4312* (2013.01); *H04N 21/44222* (2013.01); *H04N 21/4532* (2013.01); *H04N 21/482* (2013.01); *H04N 21/485* (2013.01); *H04N 21/80* (2013.01)
USPC .................. 725/45; 725/37; 725/39; 725/44; 725/52; 715/700

(58) Field of Classification Search
USPC ......................................... 725/39, 44, 45, 52
See application file for complete search history.

(56) References Cited

U.S. PATENT DOCUMENTS 6,005,601 A * 12/1999 Ohkura et al. .................. 725/52
6,147,714 A * 11/2000 Terasawa et al. ............. 348/564
(Continued)

FOREIGN PATENT DOCUMENTS

EP   0 790 738 A2   8/1997
EP   0 790 738 A3   1/1999
(Continued)

OTHER PUBLICATIONS

Notice of Reexamination issued Aug. 4, 2010 in counterpart Chinese Application No. 200710096457.7.
(Continued)

*Primary Examiner* — Nasser Goodarzi
*Assistant Examiner* — Kyu Chae
(74) *Attorney, Agent, or Firm* — Sughrue Mion, PLLC

(57) ABSTRACT

A method and apparatus for browsing a plurality of broadcast programs are provided. The method includes classifying a plurality of broadcast programs into one or more broadcast program groups with reference to electronic program guide (EPG) information or viewing records of a user regarding the broadcast programs, one-dimensionally arranging the broadcast programs so that the broadcast program groups are one-dimensionally arranged, displaying the broadcast programs and the broadcast program groups on a screen as a graphic image, and allowing the user to change a rule used for forming the broadcast program groups. Accordingly, it is possible to enable a user to effectively browse broadcast programs and to provide the user with a user interface customized for the user by using a simple one-dimensional input method and intuitively utilizing EPG information.

41 Claims, 9 Drawing Sheets

(51) Int. Cl.
*H04N 21/431* (2011.01)
*H04N 21/442* (2011.01)
*H04N 21/45* (2011.01)
*H04N 21/482* (2011.01)
*H04N 21/485* (2011.01)
*H04N 21/80* (2011.01)

(56) References Cited

U.S. PATENT DOCUMENTS

| | | | |
|---|---|---|---|
| 6,445,306 B1* | 9/2002 | Trovato et al. | 340/825.24 |
| 7,716,701 B2* | 5/2010 | Son et al. | 725/39 |
| 2001/0023401 A1* | 9/2001 | Weishut et al. | 705/1 |
| 2003/0093790 A1* | 5/2003 | Logan et al. | 725/38 |
| 2004/0073920 A1* | 4/2004 | Yuen et al. | 725/41 |
| 2004/0125124 A1* | 7/2004 | Kim et al. | 345/716 |
| 2004/0172648 A1* | 9/2004 | Xu et al. | 725/38 |
| 2004/0226042 A1* | 11/2004 | Ellis | 725/43 |
| 2004/0244038 A1* | 12/2004 | Utsuki et al. | 725/46 |
| 2005/0125827 A1 | 6/2005 | Moreau et al. | |
| 2005/0257152 A1* | 11/2005 | Shimizu et al. | 715/723 |
| 2005/0283803 A1* | 12/2005 | Kimura et al. | 725/46 |
| 2006/0020970 A1 | 1/2006 | Utsuki et al. | |

FOREIGN PATENT DOCUMENTS

| | | |
|---|---|---|
| EP | 1 195 990 A1 | 4/2002 |
| JP | 937181 A | 2/1997 |
| JP | 200456462 A | 2/2004 |
| KR | 10-2001-0045353 A | 6/2001 |
| KR | 10-2002-0000179 A | 1/2002 |
| KR | 1020050015074 A | 2/2005 |
| KR | 1020050020744 A | 3/2005 |
| KR | 10-2005-0122416 A | 12/2005 |
| KR | 10-2005-0123284 A | 12/2005 |
| WO | 2004-010689 A1 | 1/2004 |
| WO | 2005/069613 A1 | 7/2005 |
| WO | WO 2005/067292 A1 | 7/2005 |

OTHER PUBLICATIONS

Communication from the Japanese Patent Office dated Feb. 26, 2013, in a counterpart application No. 2007-098625.

Communication dated Nov. 12, 2013 issued by the Japanese Patent Office in counterpart Japanese Patent Application No. 2007098625.

* cited by examiner

METHOD AND APPARATUS FOR BROWSING BROADCAST PROGRAMS USING DYNAMIC USER INTERFACE

CROSS-REFERENCE TO RELATED PATENT APPLICATION

This application claims priority from Korean Patent Application No. 10-2006-0055915, filed on Jun. 21, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a user interface, and more particularly, to browsing a plurality of broadcast programs which can enable a user to browse a plurality of broadcast programs using electronic program guide (EPG) information and/or TV viewing records of the user regarding the broadcast programs.

2. Description of the Related Art

In the related art, thousands of broadcast programs are aired every day on hundreds of broadcast channels, including terrestrial, cable, satellite television (TV), and digital multimedia broadcast (DMB) channels. User interfaces for browsing broadcast programs may use a related art broadcast program browsing method that involves inputting a channel number or sequentially increasing or decreasing the channel number until a channel of interest is encountered.

However, the number of broadcast channels has increased to the extent that a user cannot memorize all of the broadcast channels provided. Accordingly, a user may not be able to learn such information as the channel on which a broadcast program of interest is to be aired, or what broadcast programs are currently being aired, by using the related art broadcast program browsing method of sequentially increasing or decreasing a channel number.

Even though the related art broadcast program browsing method of sequentially increasing or decreasing a channel number has the aforementioned drawbacks, this method has been widely used because of simplicity of manipulation. In other words, when broadcast programs are one-dimensionally arranged, a user can browse broadcast channels simply by sequentially increasing or decreasing the channel number.

Since channel numbers are rarely associated with the attributes of broadcast programs, the channel browsing efficiency of the related art broadcast program browsing method of sequentially increasing or decreasing a channel number is low. However, the related art broadcast program browsing method of sequentially increasing or decreasing a channel number has been one of the most-widely used broadcast program browsing methods due to simplicity and convenience of manipulation.

In the meantime, as EPG information becomes commonplace, information that can be used when browsing broadcast channels or broadcast programs has diversified, and an increasing number of browsing methods have been developed. Related art EPG-based user interfaces allow a user to learn information regarding broadcast programs currently being aired on TV or broadcast programs to be aired on TV within a predetermined period of time, and provide users with not only channel number information but also additional information provided by an EPG.

A variety of EPG-based user interfaces have been developed. FIG. 1A presents a related art EPG-based user interface. Referring to the EPG-based user interface presented in FIG. 1A, broadcast programs are vertically arranged according to their channels, and are horizontally arranged in order of air time. In general, the titles of broadcast programs are displayed in a user interface. The titles of broadcast programs belonging to different genres may be represented with different background colors or different icons. In the case of the user interface presented in FIG. 1A, there is a clear limit in the amount of information that can be displayed on a screen, and thus, it is difficult to display broadcast program information on the screen such that all the broadcast program information can be viewed at a glance.

As a modification of the aforementioned related art user interfaces, a related art method of allowing a user to control the number of broadcast program titles that can be displayed on a screen by providing a user interface with a zoom-in function, as illustrated in FIG. 1B, has been suggested. EPG information enables a variety of broadcast program searches based on the attributes of broadcast programs. Thus, a method of classifying broadcast programs into one or more groups according to their attributes (e.g., genres) and displaying the broadcast programs in units of the groups, as illustrated in FIG. 1C, has been widely used.

In short, related art user interfaces capable of browsing broadcast programs using EPG information accompany more complicated input sequences than the related art broadcast program browsing method of one-dimensionally increasing or decreasing a channel number. Also, related art EPG-based user interfaces classify broadcast programs only in consideration of the attributes of the broadcast programs, and thus fail to reflect user preferences regarding the broadcast programs.

SUMMARY OF THE INVENTION

The present invention provides a user interface which maintains a one-dimensional manipulation browsing method and enables a user to intuitively browse a plurality of broadcast programs using a variety of information provided by an EPG and/or TV viewing records of the user regarding the broadcast programs.

According to an aspect of the present invention, there is provided a method of providing a user interface for browsing a plurality of broadcast programs. The method includes classifying a plurality of broadcast programs into one or more broadcast program groups according to a rule, one-dimensionally arranging the broadcast programs so that the broadcast program groups are one-dimensionally arranged, and selecting, in response to a first input signal, a broadcast program that follows a current broadcast program currently being selected by a user, and selecting, in response to a second input signal, a first broadcast program of a broadcast program group that follows a current broadcast program group including the current broadcast program.

The method may also include displaying a graphic image representing the broadcast program groups on a screen, and displaying an indicator in the graphic image indicating the location of the current broadcast program on the screen.

The one-dimensionally arranging may include arranging broadcast programs that belong to the same broadcast program group and share the same attribute to be adjacent to one another according to a rule, and the displaying may include displaying a graphic image in which broadcast programs having different attributes can be visually differentiated from one another.

The rule for classifying the broadcast programs and/or the rule for arranging the broadcast programs may be changed according to user input.

According to another aspect of the present invention, there is provided a computer-readable recording medium having recorded thereon a computer program for executing the method.

According to another aspect of the present invention, there is provided an apparatus for providing a user interface for browsing a plurality of broadcast programs. The apparatus includes a group determination unit which classifies a plurality of broadcast programs into one or more broadcast program groups according to a rule, an arrangement unit which one-dimensionally arranges the broadcast programs so that the broadcast program groups are one-dimensionally arranged, and a selection unit which selects, in response to a first input signal, a broadcast program that follows a current broadcast program currently being selected by a user, and selects, in response to a second input signal, a first broadcast program of a broadcast program group that follows a current broadcast program group including the current broadcast program.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

The present invention will now be described more fully with reference to the accompanying drawings in which exemplary embodiments of the invention are shown. The terms used herein are defined based on the invention claimed in this disclosure.

Figure 1A:
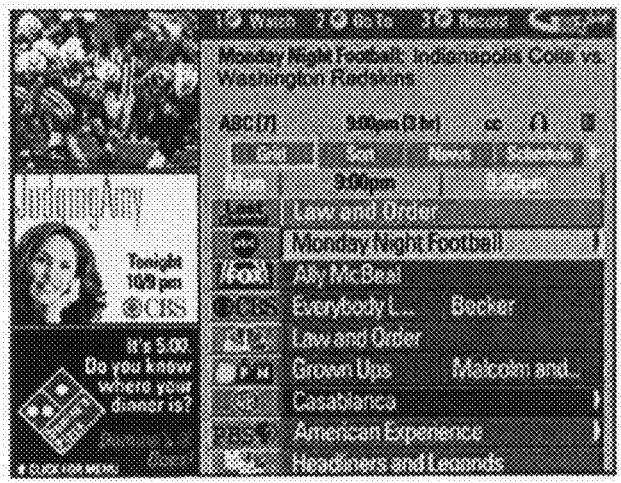
FIGS. 1A through 1C present related art user interfaces.
Figure 1B:
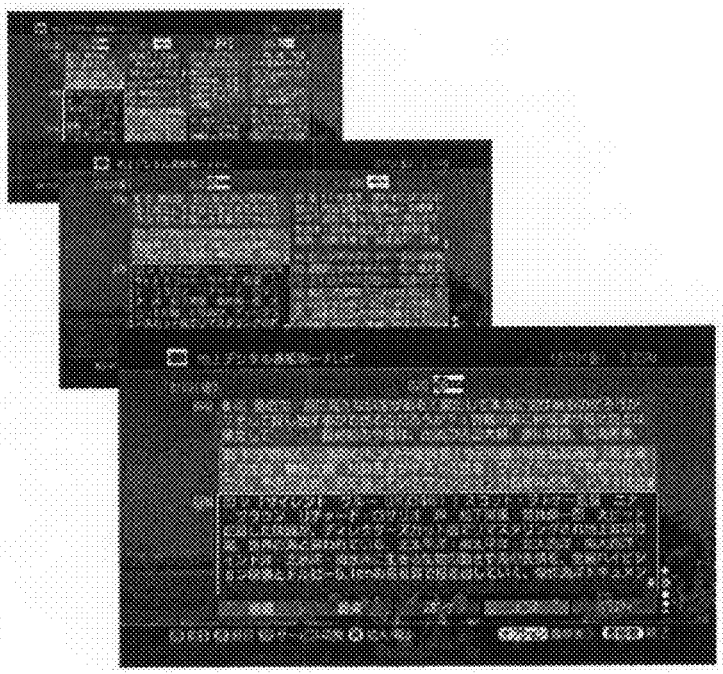
Figure 1C:
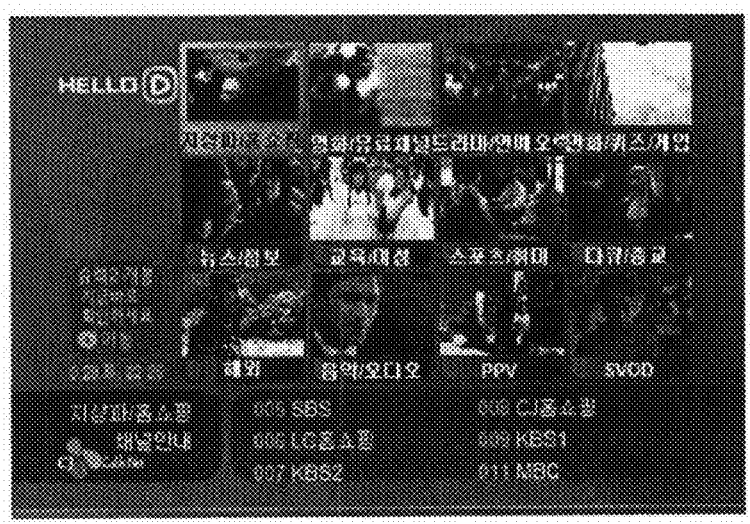
Figure 2:
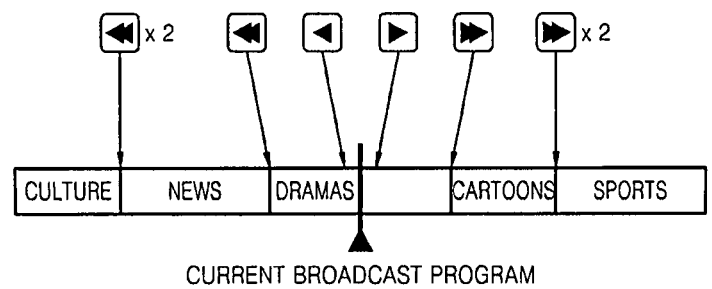
FIG. 2 is a diagram for explaining a method of selecting a broadcast program or a group of broadcast programs according to an exemplary embodiment of the present invention.

FIG. 2 is a diagram for explaining a method of selecting a broadcast program or a group of program according to an exemplary embodiment of the present invention.

According to the exemplary embodiment, broadcast reception apparatuses (hereinafter collectively referred to as TVs) display a graphic image (hereinafter referred to as a guidance graphic image) illustrated in FIG. 2 on a screen. A guidance graphic image may display a plurality of broadcast programs, including broadcast programs currently being aired or broadcast programs to be aired within a period, wherein the length of the period may be set by a user. Also, a guidance graphic image displays an indicator indicating a broadcast program chosen by a user, i.e., a broadcast program currently being displayed on a screen.

Referring to FIG. 2, broadcast programs of all channels that can be received by a TV of a user, including broadcast programs currently being aired or broadcast programs to be aired within a period, are classified into one or more broadcast program groups according to their genres (e.g. the broadcast program groups include culture, news, drama, cartoon, and sports groups). The TV is tuned to a broadcast program that belongs to the drama group. According to the exemplary embodiment, a rule for forming such broadcast program groups may be set by the user, and a guidance graphic image may be dynamically changed according to the results of the setting. This will be described later in further detail.

A guidance graphic image does not display detailed information regarding each broadcast program, but displays a plurality of broadcast programs logically and one-dimensionally. In other words, a user can sequentially select the broadcast programs displayed in the guidance graphic image in a forward direction by pressing a right button of an input device such as a remote control so that an indicator can move to the right. Also, the user can sequentially select the broadcast programs displayed in the guidance graphic image in a backward direction by pressing a left button of the input device so that the indicator can move to the left.

The user can jump from one broadcast program group to another by pressing a fast forward (FF) button or a rewind (REW) button of the input device. For example, when the user presses the FF button when a broadcast program is selected, a first broadcast program of a broadcast program group that follows a broadcast program group (hereinafter referred to as the current broadcast program group) including the selected broadcast program is selected. On the other hand, when the user presses the REW button, a first broadcast program of a broadcast program group that precedes the current broadcast program group is selected. Alternatively, the user can jump to a first broadcast program of the current broadcast program group by pressing the REW button.

As described above, according to the exemplary embodiment, a user can learn from a guidance graphic image information regarding a broadcast program group and the location of a broadcast program currently being selected by the user by using such a simple method of increases/decreases a channel or a broadcast program group. Thus, it is possible to effectively browse broadcast programs. The length of each section in a guidance graphic image representing a broadcast program group may be proportional to the number of broadcast programs included in the broadcast program group and/or to the running times of the broadcast programs combined. Alternatively, all sections respectively representing broadcast program groups may be displayed in a guidance graphic image to have the substantially same length.

Figure 3:
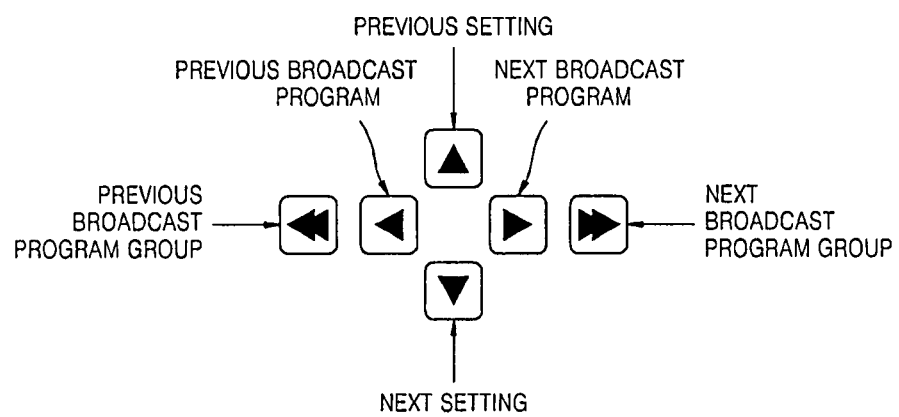
FIG. 3 is a diagram illustrating a plurality of buttons of an input device for browsing broadcast programs according to an exemplary embodiment of the present invention.

FIG. 3 is a diagram illustrating a plurality of buttons of an input device for browsing broadcast programs according to an exemplary embodiment of the present invention. The buttons illustrated in FIG. 3 are used only for browsing broadcast programs. Thus, an input device in which a user interface according to an exemplary embodiment of the present invention is realized may include buttons other than those illustrated in FIG. 3.

As described above with reference to FIG. 2, a user may sequentially select a plurality of broadcast programs logically and one-dimensionally displayed in a guidance graphic image by using a left button or a right button. Also, the user may sequentially select a plurality of broadcast program groups by using a FF button and a REW button.

In addition to the aforementioned buttons, the user may use an up button and a down button to determine a rule for arranging a plurality of broadcast programs in a guidance graphic image, i.e., a rule for forming broadcast program groups. Examples of the rule for forming broadcast program groups may include the genres, titles, channel names, and casts of broadcast programs, and viewing records of the user regarding the broadcast programs. For example, broadcast programs may be classified into one or more broadcast program groups according to their genres or the first letters of their titles. Broadcast programs sharing the same channel name or the same casts may be classified as belonging to the same broadcast program group. Also, broadcast programs that have already been viewed by the user may be classified as belonging to the same group. For example, a broadcast program consisting of a plurality of episodes, like a drama, may be classified according to whether the user has viewed a previous episode of the broadcast program for longer than an amount of time. Broadcast programs may be classified in various manners other than those set forth herein. For example, broadcast programs may be classified according to the user's preferences, and this will be described later in further detail with reference to FIG. 6.

A main broadcast program group may be classified into one or more smaller broadcast program groups (hereinafter referred to as lower broadcast program groups) according to a rule. Examples of the rule for forming lower broadcast program groups, like those of the rule for forming main broadcast program groups, may include the genres, titles, channel names, and casts of broadcast programs, and viewing records of the user regarding the broadcast programs. In other words, assuming that a plurality of broadcast programs are classified into three main broadcast program groups 'Movies', 'Dramas', and 'Entertainment', broadcast programs belonging to the main broadcast program group 'Movies' may be classified into lower broadcast program groups 'Action', 'Science Fiction (SF)', and 'Comedies'. A plurality of broadcast programs belonging to a lower broadcast program group, like a plurality of broadcast programs belonging to a main broadcast program group, are one-dimensionally arranged adjacent to one another. A plurality of broadcast program groups sharing the same attributes may be integrated into a larger broadcast program group (hereinafter referred to as an upper broadcast program group). For simplicity, broadcast program groups will hereinafter be regarded as main broadcast program groups unless they are specifically mentioned as being upper or lower broadcast program groups.

Upper or lower broadcast program groups may be displayed in a guidance graphic image in such a manner that they can be visually perceived by the user, as described with reference to FIGS. 7 through 9.

Figure 4:
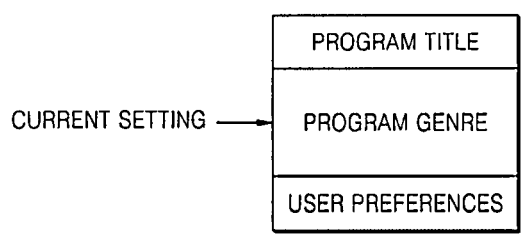
FIG. 4 is a diagram illustrating a menu screen for allowing a user to determine a rule for forming broadcast program groups, according to an exemplary embodiment of the present invention.

FIG. 4 is a diagram illustrating a menu screen for allowing a user to determine a rule for forming broadcast program groups, according to an exemplary embodiment of the present invention. Referring to FIG. 4, the menu screen is displayed on a screen. The user may select one of a plurality of rules displayed in the menu screen by using an up button or a down button. Then, a guidance graphic image is changed according to the user's selection. The menu screen illustrated in FIG. 4 indicates that broadcast programs are classified into one or more broadcast program groups according to their genres. In this case, when the user presses the up button, the broadcast programs are reclassified according to their titles, and are thus rearranged according to the results of the reclassification. On the other hand, when the user presses the down button, the broadcast programs are reclassified according to the user's preferences, and are thus rearranged according to the results of the reclassification.

A rule for forming upper or lower broadcast program groups may be different from a rule for forming main broadcast program groups. For example, assuming that three broadcast program groups 'Movies', 'Dramas', and 'Comedies' are provided according to the genres of broadcast programs, each of the broadcast program groups 'Movies', 'Dramas', and 'Comedies' may be divided into two lower broadcast program groups 'Viewed' and 'Never Viewed' according to whether the user has viewed each of a plurality of broadcast programs included in the corresponding broadcast program group.

For this, a TV may store in advance a plurality of setting values for various environments, thereby enabling the user to make a variety of settings using two directional buttons. Accordingly, a plurality of setting values displayed on a screen may be entitled, for example, "program genre-mode 1", "program genre-mode 2", and etc.

Figure 5:
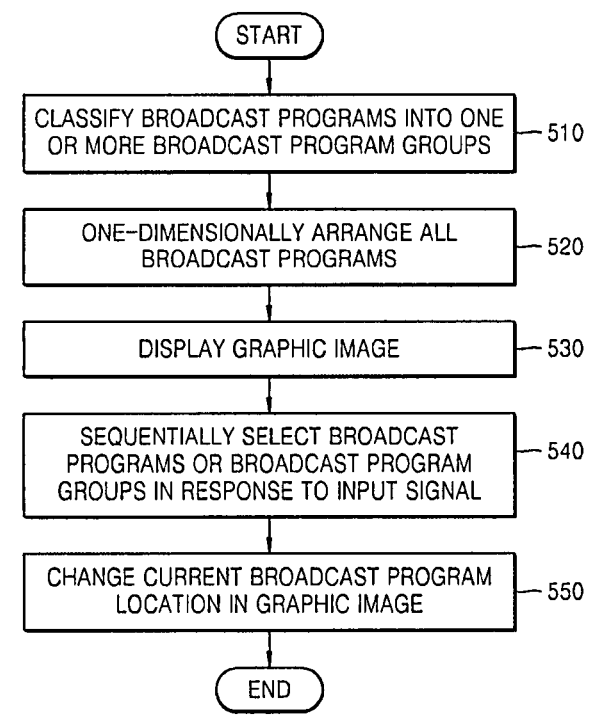
FIG. 5 is a flowchart illustrating an operating algorithm of a user interface according to an exemplary embodiment of the present invention.

FIG. 5 is a flowchart illustrating an operating algorithm of a user interface according to an exemplary embodiment of the present invention. In operation 510, a plurality of broadcast programs, including broadcast programs currently being aired and broadcast programs to be aired within a period, are classified into one or more broadcast program groups. A broadcast program may be classified as belonging to two or more broadcast program groups. For example, if a user arbitrarily sets a rule for forming broadcast program groups and thus a first broadcast program group including movie programs and a second broadcast program groups including broadcast programs to be aired on a channel are provided according to the result of the determination, then a movie program to be aired on the predetermined channel may be classified as belonging to both the first and second broadcast programs.

In operation 520, a plurality of broadcast programs belonging to each of the broadcast program groups formed in operation 510 are one-dimensionally and logically arranged so that the broadcast programs are adjacent to one another in an order. Likewise, upper and lower broadcast program groups are one-dimensionally arranged.

In operation 530, a guidance graphic image is created according to the results of the arrangement performed in operation 520, and the guidance graphic image is displayed on a screen. Main broadcast program groups, upper broadcast program groups, and lower broadcast program groups may be displayed in the guidance graphic image so that they can be visually differentiated from one another. For example, main broadcast program groups, upper broadcast program groups, and lower broadcast program groups may be represented in different colors in the guidance graphic image, and a plurality of lower groups belonging to the same main broadcast program group may also be represented in different colors in the guidance graphic image. As described above, not only the guidance graphic image but also a menu screen for changing the rule for forming broadcast program groups may be displayed on the screen.

In operation 540, the broadcast programs or the broadcast program groups that are one-dimensionally arranged are sequentially selected in response to an input signal. More specifically, the user may select a broadcast program included in a broadcast program group that follows a current broadcast program group or select a broadcast program included in a broadcast program that precedes the current broadcast program group by pressing an REW button or an FF button of an input device.

In operation 550, an indicator displayed in the guidance graphic image is moved according to the result of the selection performed in operation 540. If the user changes the rule for forming broadcast program groups, then not only the guidance graphic image but also menus displayed in the guidance graphic image may be changed accordingly.

Figure 6:
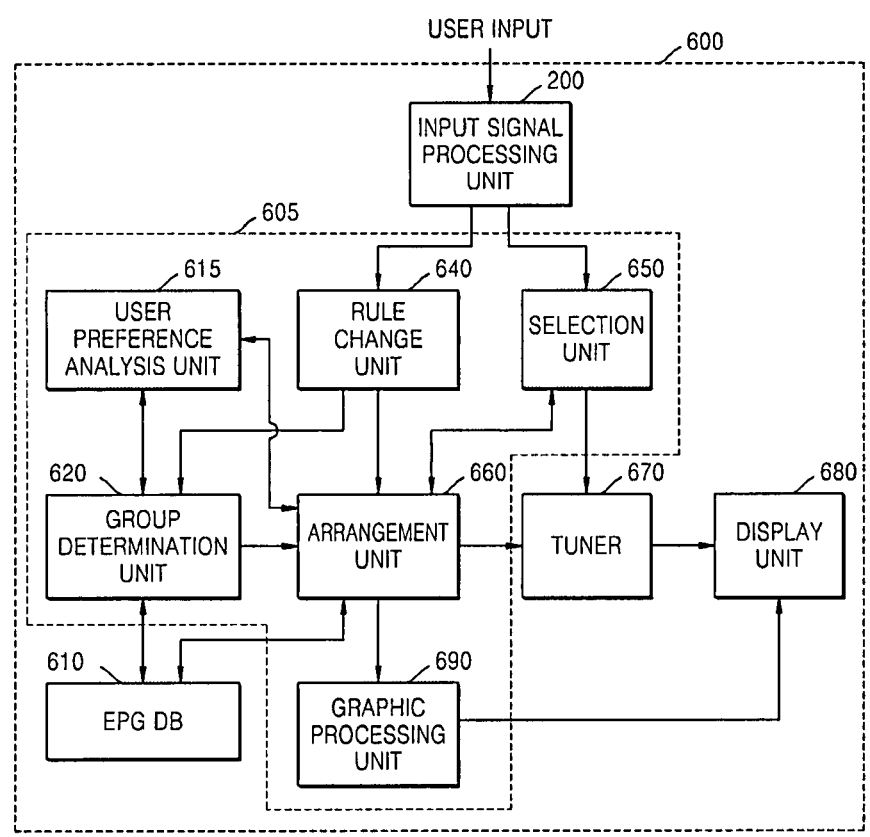
FIG. 6 is a block diagram of an apparatus for providing a user interface according to an exemplary embodiment of the present invention.

FIG. 6 is a block diagram of an apparatus for providing a user interface according to an exemplary embodiment of the present invention. The user interface 605 includes a user preference analysis unit 615, a group determination unit 620, an input signal processing unit 630, a rule change unit 640, a selection unit 650, an arrangement unit 660, and a graphic processing unit 690. The digital TV 600, which includes the user interface 605, may also include an electronic program guide (EPG) database 610, a tuner 670, and a display unit 680.

The group determination unit 620 classifies a plurality of broadcast programs, including broadcast programs currently being aired and broadcast programs to be aired within a period, into one or more broadcast program groups according to a rule by referencing the EPG database 610. Examples of the rule may include the genres, titles, and channel names of the broadcast programs, and viewing records of a user regarding the broadcast programs. In other words, examples of the rule may be classified into program attributes and user preferences. If the broadcast programs are classified according to their attributes, then the group determination unit 620 may reference the EPG database 610. On the other hand, if the broadcast programs are classified according to the user's preferences, then the group determination unit 620 may receive user preference information regarding the broadcast programs from the user preference analysis unit 615, and reference the user preference information.

The user preference analysis unit 615 analyzes viewing records of the viewer regarding the broadcast programs by referencing a user viewing record database (not shown), and provides the results of the analysis, i.e., the user preference information, to the group determination unit 620 and the arrangement unit 660. Here, the viewing records of the user regarding the broadcast programs include information indicating whether the user has viewed the broadcast programs and how long the user has viewed the broadcast programs, and are stored in the user viewing record database. The user preference information may be used to determine preferences among the broadcast programs. Also, the viewing records of the user regarding the broadcast programs may also include information obtained when the user records broadcast programs and reproduce the recorded broadcast programs as well as information obtained when the user switches channels and watch broadcast programs. Accordingly, the user preference analysis unit 615 may calculate the user preference information based on the aforementioned information of the viewing records of the user regarding the broadcast programs. For example, the user preference analysis unit 615 may determine that a broadcast program already viewed by the user is more preferred than a broadcast program never viewed by the user, that a broadcast program recorded and reproduced by the user is more preferred than a broadcast program never recorded and reproduced, and that a broadcast program viewed by the user for about forty minutes is more preferred than a broadcast program viewed by the user for about twenty minutes.

The arrangement unit 660 one-dimensionally arranges all the broadcast programs according to the results of the classification performed by the group determination unit 620, and determines upper and/or lower broadcast program groups. The upper and/or lower broadcast program groups may be formed using the same rule used to forming main broadcast program groups, i.e., the genres, titles, or channel names of the broadcast programs, or viewing records of the user regarding the broadcast programs. Once the upper and/or lower broadcast program groups are determined, the arrangement unit 660 arranges a plurality of main broadcast program groups belonging to the same upper broadcast program group to be adjacent to one another, and arranges a plurality of broadcast programs belonging to the same lower broadcast program group to be adjacent to one another.

The input signal processing unit 200 receives a signal input by the user with the aid of an input device. When the user presses an up button or a down button of the input device, the rule change unit 640 changes the rule for forming broadcast program groups accordingly so that the broadcast programs are rearranged.

The selection unit 650 sequentially selects the broadcast programs or the broadcast program groups obtained by the group determination unit 620 according to user input. A broadcast program selected by the selection unit 650 is received by the tuner 670, and is displayed by the display unit 680.

The graphic processing unit 690 uses the display unit 680 to visually provide the user with a guidance graphic image representing the broadcast program groups and an indicator indicating the location of program currently being selected.

Figure 7:
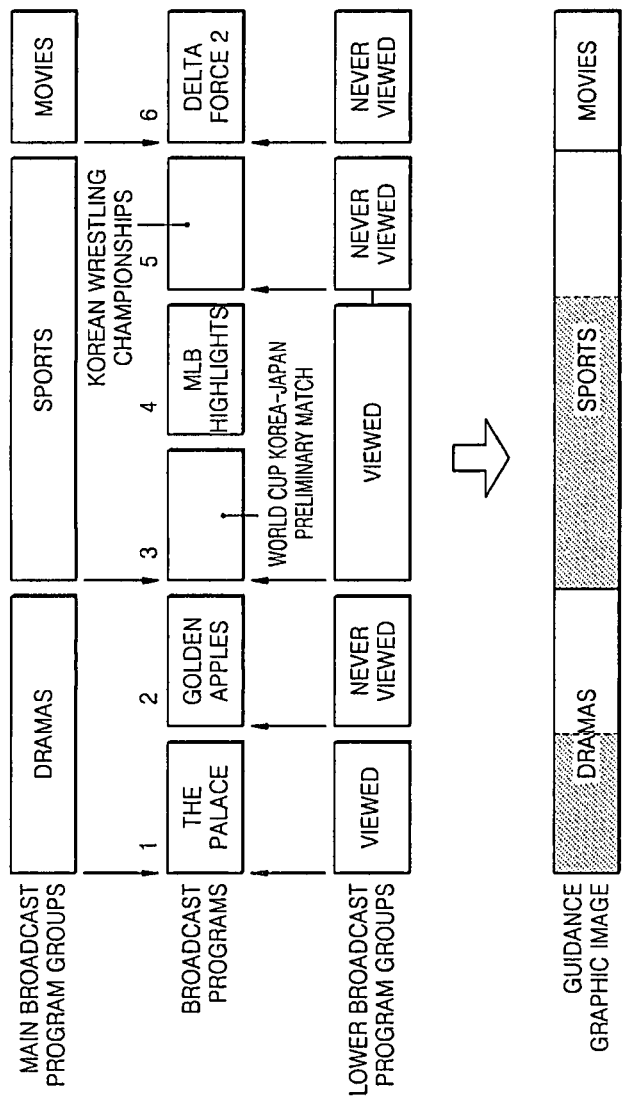
FIG. 7 is a diagram illustrating a user interface according to an exemplary embodiment of the present invention.

FIG. 7 is a diagram illustrating a user interface according to an exemplary embodiment of the present invention. Broadcast programs are classified into three main broadcast program groups 'Dramas', 'Sports', and 'Movies'. Broadcast programs belonging to each of the main broadcast program groups are further classified into a lower broadcast program group 'Viewed' including broadcast programs that have been viewed by a user, and a lower broadcast program group 'Never Viewed' including broadcast programs that have never been viewed by the user with reference to viewing records of the user regarding the broadcast programs.

Broadcast programs belonging to the same main broadcast program group are one-dimensionally arranged to be adjacent to one another. Of broadcast programs belonging to the same main broadcast program group, the broadcast programs belonging to the same lower broadcast program group are arranged to be adjacent to one another.

According to the aforementioned settings, a guidance graphic image illustrated at the bottom of FIG. 7 is displayed. A plurality of lower broadcast program groups belonging to the same main broadcast program group may be represented in different colors in the guidance graphic image so that the user can intuitively differentiate the lower broadcast program groups from one another with ease. FIG. 7 does not illustrate an indicator indicating a broadcast program currently being selected by the user.

Figure 8:
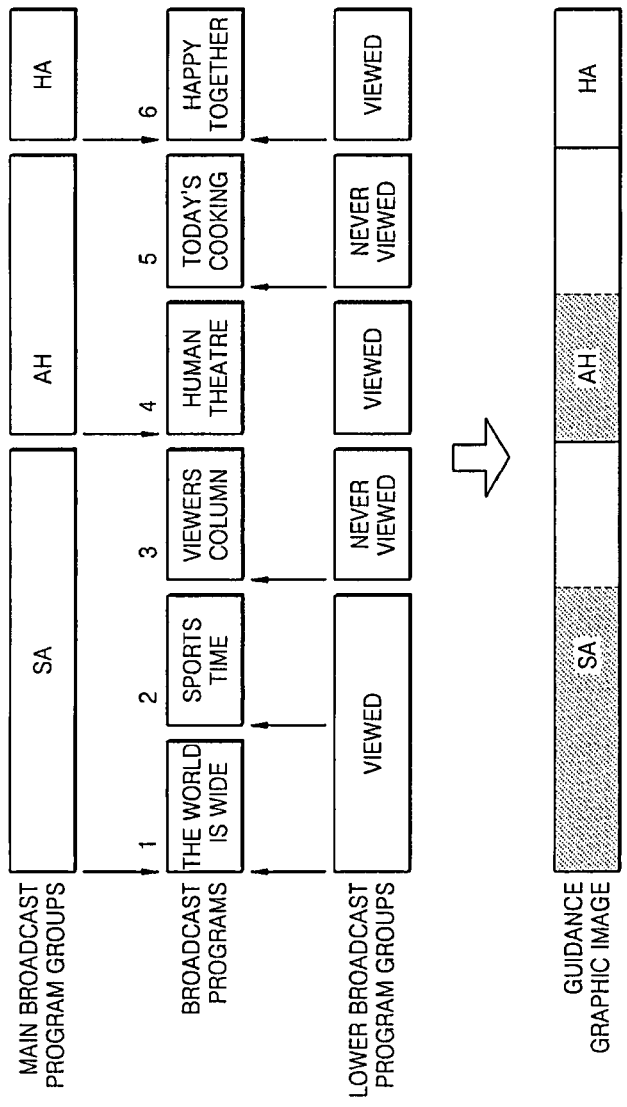
FIG. 8 is a diagram illustrating a user interface according to another exemplary embodiment of the present invention.

FIG. 8 is a diagram illustrating a user interface according to another exemplary embodiment. Broadcast programs are classified into three main broadcast program groups according to the first letters of their titles. Like in the exemplary embodiment of FIG. 7, broadcast programs belonging to each of the three main broadcast program groups are further classified into a lower broadcast program group 'Viewed' including broadcast programs that have been viewed by a user, and a lower broadcast program group 'Never Viewed' including broadcast programs that have never been viewed by the user. FIG. 8 does not illustrate an indicator indicating a broadcast program currently being selected by the user.

Figure 9:
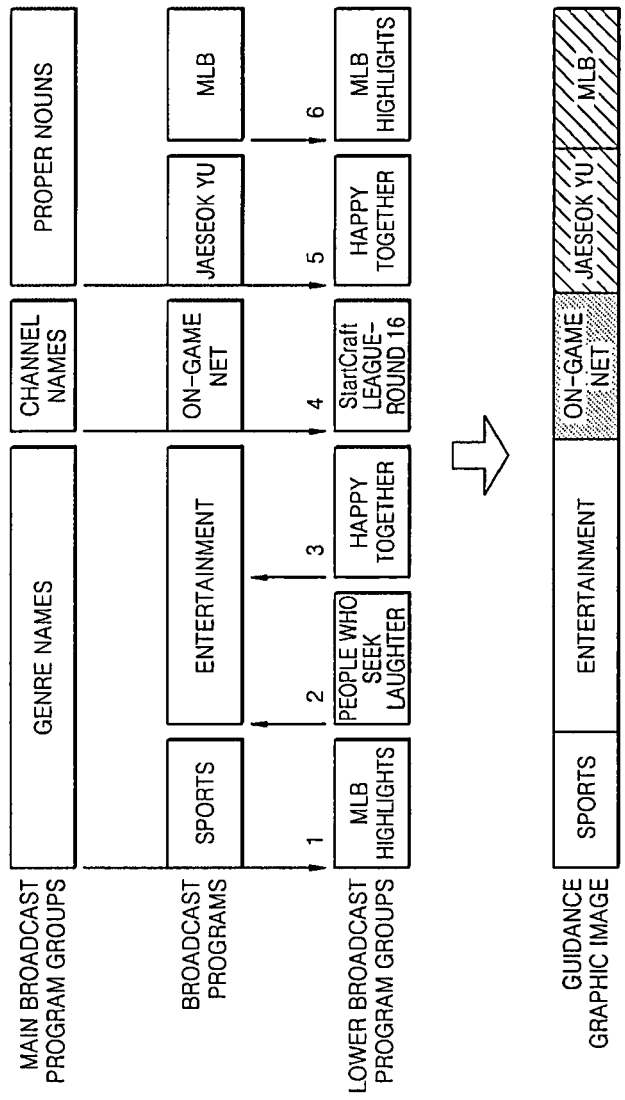
FIG. 9 is a diagram illustrating a user interface according to another exemplary embodiment of the present invention.

FIG. 9 is a diagram illustrating a user interface according to another exemplary embodiment of the present invention. Broadcast programs are classified according to keywords arbitrarily set by a user into five main broadcast program groups, i.e., a first main broadcast program group 'Sports' including sports programs, a second main broadcast program group 'Entertainment' including entertainment programs, a third main broadcast program group 'On-Game Net' including broadcast programs aired on channel "On-Game Net", a fourth main broadcast program group 'Jaeseok Yu' including broadcast programs starring the Korean comedian "Jaeseok Yu", and a fifth main broadcast program group 'MLB' including MLB-related broadcast programs. The five main broadcast program groups are integrated into three upper broadcast programs 'Genre Names', 'Channel Names', and 'Proper Nouns' according to their attributes.

Referring to a guidance graphic image illustrated at the bottom of FIG. 9, main broadcast program groups belonging to the same upper broadcast program group are represented in the same color, and thus, the user can intuitively differentiate the three upper broadcast program groups from one another. FIG. 9 does not illustrate an indicator indicating the location of a broadcast program currently being selected by the user.

Figure 10:
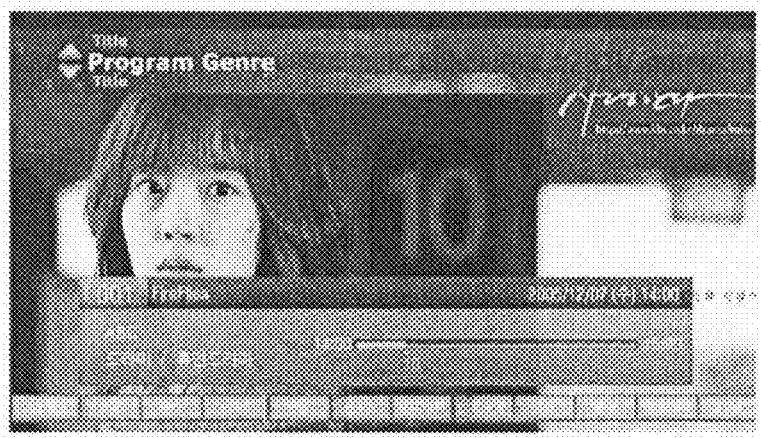
FIG. 10 is a diagram illustrating a screen to which a user interface according to an exemplary embodiment of the present invention is applied.

FIG. 10 presents a screen to which a user interface according to an exemplary embodiment of the present invention is applied. Referring to FIG. 10, a lower portion of the screen displays a plurality of broadcast program groups, each broadcast program group including broadcast programs currently being aired on all channels and/or broadcast programs to be aired on the channels within a predetermined period of time. An upper portion of the screen displays a menu screen indicating that the broadcast program groups are obtained according to the genres of broadcast programs.

Then, the user can browse broadcast programs simply using a right button or a left button of an input device, and skip broadcast program groups that do not interest the user by using an FF button or a REW button of the input device. When the user presses an up button or a down button of the input device when the screen is as illustrated in FIG. 10, broadcast programs are reclassified into one or more main broadcast program groups according to the first letters of their titles, and a guidance graphic image is changed accordingly.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

Additionally, the "units" discussed above with respect to the foregoing exemplary embodiments may be implemented as hardware including but not limited to circuits, software including the above-described computer-readable code, or a combination thereof, as would be understood by one skilled in the art.

According to the present invention, it may be possible for a user to browse broadcast programs by using a simple one-dimensional input method and intuitively utilizing EPG information.

Also, according to the present invention, it may be possible to customize a user interface for each user by reflecting not only attribute information of broadcast programs that can be obtained from an EPG but also viewing records of each user regarding the broadcast programs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for a user interface processing apparatus to provide a user interface for browsing a plurality of broadcast programs, the method comprising:
   classifying a plurality of broadcast programs currently being aired or to be aired from a plurality of channels into a plurality of broadcast program groups according to a rule;
   one-dimensionally arranging the broadcast programs in a program order within a single program bar so that the broadcast program groups are one-dimensionally arranged in a group order within the single program bar;
   receiving a first input signal;
   selecting, in response to the first input signal, a next broadcast program in the program order that follows a current broadcast program;
   receiving a second input signal;
   selecting, in response to the second input signal, a first broadcast program of a next broadcast program group in the group order that follows a current broadcast program group including the current broadcast program; and
   displaying a graphic image representing the broadcast program groups in the form of the single program bar on a screen,
   wherein the displayed single program bar comprises a plurality of portions and a plurality of subportions,
   each broadcast program group of the plurality of broadcast program groups is mapped to a different portion of the plurality of portions and each broadcast program of the plurality of broadcast programs is mapped to a different subportion of the plurality of subportions such that the plurality of portions and the plurality of subportions are simultaneously displayed in the displayed single program bar, and
   a number of the plurality of subportions corresponds to a number of the plurality of broadcast programs from the plurality of channels.

2. The method of claim 1, further comprising:
   displaying an indicator in the displayed single program bar which moves between a first end and a second end of the displayed single program bar,
   wherein the broadcast programs are visually represented among a plurality of continuous adjoining locations located throughout an entire length of the displayed single program bar, and
   the displayed indicator indicates a location of a current broadcast program being displayed on the screen.

3. The method of claim 1, wherein the classifying the plurality of broadcast programs comprises classifying the plurality of broadcast programs into a plurality of groups which are represented by section blocks in the displayed single program bar, the section blocks being interconnected with each other to form the displayed single program bar, and
   the one-dimensionally arranging comprises arranging the broadcast programs in the program order such that the broadcast programs are visually represented simultaneously within the displayed single program bar according to the program order, arranging the broadcast program groups in the group order such that the broadcast program groups are visually represented simultaneously within the displayed single program bar according to the group order, and, in each of the section blocks representing the broadcast program groups, arranging the program order such that broadcast programs that share a same attribute are visually represented adjacent to one another according to another rule, and the displaying comprises displaying the single program bar in which broadcast programs having different attributes are visually differentiated.

4. The method of claim 3, wherein the displaying comprises displaying a graphic image in which broadcast programs having different attributes are represented in different colors.

5. The method of claim 3, wherein at least one of the rule for classifying the broadcast programs and the rule for arranging the broadcast programs is dynamically changed through a selection from a plurality of rules to rearrange the broadcast programs into at least one of a different group order and a different program order corresponding to the changed rule, the selection made according to a user input.

6. The method of claim 3, wherein the displaying comprises displaying the single program bar in which a length of each section block representing a broadcast program group is proportional to a number of broadcast programs included in the broadcast program group.

7. The method of claim 3, wherein the displaying comprises displaying the single program bar in which a length of each section block representing a broadcast program group is proportional to a summation of running times of the broadcast programs included in the broadcast program group.

8. The method of claim 1, wherein the one-dimensionally arranging comprises arranging a plurality of broadcast program groups that share a common attribute to be adjacent to one another according to the rule, and the displaying comprises displaying the graphic image in which broadcast program groups having different attributes can be visually differentiated.

9. The method of claim 8, wherein the displaying comprises displaying a graphic image in which broadcast program groups having different attributes are represented in different colors.

10. The method of claim 8, wherein at least one of the rule for classifying the broadcast programs and the rule for arranging the broadcast program groups is dynamically changed through a selection from a plurality of rules, the selection made according to user input.

11. The method of claim 1, wherein the rule for classifying the broadcast programs comprises a plurality of categories, including genres, titles, channel names, casts of the broadcast programs and viewing records of the user regarding the broadcast programs, the rule is dynamically changed among the plurality of categories through a selection, and the broadcast program groups are changed and the program order is reordered when the selection is made according to a user input.

12. The method of claim 3, wherein the rule for arranging the broadcast program groups comprises a plurality of categories, including genres, titles, channel names, casts of the broadcast programs and viewing records of the user regarding the broadcast programs, the rule is dynamically changed among the plurality of categories through a selection, and the broadcast program groups are changed and the program order is reordered when the selection is made according to a user input.

13. The method of claim 1, further comprising:
selecting, in response to a third input signal, a broadcast program included in a broadcast program group that precedes the current broadcast program group; and selecting, in response to a fourth input signal, a broadcast program included in a broadcast program group that follows the current broadcast program group.

14. A non-transitory computer-readable recording medium having recorded thereon a computer program that executes a method of providing a user interface for browsing a plurality of broadcast programs, the method comprising:
classifying a plurality of broadcast programs currently being aired or to be aired from a plurality of channels into a plurality of broadcast program groups according to a rule;
one-dimensionally arranging the broadcast programs in a program order within a single program bar so that the broadcast program groups are one-dimensionally arranged in a group order within the single program bar;
selecting, in response to a first input signal, a next broadcast program in the program order that follows a current broadcast program, and selecting, in response to a second input signal, a first broadcast program of a next broadcast program group in the group order that follows a current broadcast program group including the current broadcast program; and
displaying a graphic image representing the broadcast program groups in the form of the single program bar on a screen,
wherein the displayed single program bar comprises a plurality of portions and a plurality of subportions, and
each broadcast program group of the plurality of broadcast program groups is mapped to a different portion of the plurality of portions and each broadcast program of the plurality of broadcast programs is mapped to a different subportion of the plurality of subportions such that the plurality of portions and the plurality of subportions are simultaneously displayed in the displayed single program bar, and
a number of the plurality of subportions corresponds to a number of the plurality of broadcast programs from the plurality of channels.

15. An apparatus for providing a user interface for browsing a plurality of broadcast programs, the apparatus comprising:
a group determination unit which classifies a plurality of broadcast programs currently being aired or to be aired from a plurality of channels into a plurality of broadcast program groups according to a rule;
an arrangement unit which one-dimensionally arranges the broadcast programs in a program order within a single program bar so that the broadcast program groups are one-dimensionally arranged in a group order within the single program bar;
a selection unit which selects, in response to a first input signal, a next broadcast program in the program order that follows a current broadcast program, and selects, in response to a second input signal, a first broadcast program of a next broadcast program group in the group order that follows a current broadcast program group including the current broadcast program; and
a graphic processing unit which displays a graphic image representing the broadcast program groups in the form of the single program bar on a screen,
wherein the displayed single program bar comprises a plurality of portions and a plurality of subportions, and
each broadcast program group of the plurality of broadcast program groups is mapped to a different portion of the plurality of portions and each broadcast program of the plurality of broadcast programs is mapped to a different subportion of the plurality of subportions such that the plurality of portions and the plurality of subportions are simultaneously displayed in the displayed single program bar, and a number of the plurality of subportions corresponds to a number of the plurality of broadcast programs from the plurality of channels.

16. The apparatus of claim 15, wherein the graphic processing unit displays an indicator in the displayed single program bar which moves between a first end and a second end of the displayed single program bar, wherein the broadcast programs are visually represented among a plurality of continuous adjoining locations located throughout an entire length of the displayed single program bar, and the displayed indicator indicates a location of a current broadcast program being displayed on the screen.

17. The apparatus of claim 15, wherein the group determination unit classifies the plurality of broadcast programs into a plurality of groups which are represented by section blocks in the displayed single program bar, the section blocks being interconnected with each other to form the displayed single program bar, and the arrangement unit arranges the broadcast programs in the program order such that the broadcast programs are visually represented simultaneously within the displayed single program bar according to the program order, arranging the broadcast program groups in the group order such that the broadcast program groups are visually represented simultaneously within the displayed single program bar according to the group order, and arranges the program order in each of the section blocks representing the broadcast program groups such that the broadcast programs that share a same attribute are visually represented adjacent to one another according to a second rule, and the graphic processing unit displays the single program bar in which broadcast programs having different attributes are visually differentiated.

18. The apparatus of claim 17, wherein the graphic processing unit displays a graphic image in which broadcast programs having different attributes are represented in different colors.

19. The apparatus of claim 17, further comprising a rule change unit which dynamically changes at least one of the rule for classifying the broadcast programs and the rule for arranging the broadcast program groups through a selection from a plurality of rules to rearrange the broadcast programs into at least one of a different group order and a different program order corresponding to the changed rule, the selection made according to user input.

20. The apparatus of claim 17, wherein the graphic processing unit displays the single program bar in which a length of each section block representing a broadcast program group is proportional to a number of broadcast programs included in the broadcast program group.

21. The apparatus of claim 17, wherein the graphic processing unit displays the single program bar in which a length of each section block representing a broadcast program group is proportional to a summation of running times of broadcast programs included in the broadcast program group.

22. The apparatus of claim 15, wherein the arrangement unit arranges a plurality of broadcast program groups that share a same attribute to be adjacent to one another according to the rule, and the graphic processing unit displays a graphic image in which broadcast program groups having different attributes can be visually differentiated.

23. The apparatus of claim 22, wherein the graphic processing unit displays a graphic image in which broadcast program groups having different attributes are represented in different colors.

24. The apparatus of claim 22, further comprising a rule change unit which dynamically changes at least one of the rule for classifying the broadcast program and the rule for arranging the broadcast program groups through a selection from a plurality of rules, the selection made according to user input.

25. The apparatus of claim 15, wherein the rule for classifying the broadcast program comprises a plurality of categories, including genres, titles, channel names, casts of the broadcast programs and viewing records of the user regarding the broadcast programs, the rule is dynamically changed among the plurality of categories through a selection, and the broadcast program groups are changed and the program order is reordered when the selection is made according to a user input.

26. The apparatus of claim 17, wherein the rule for arranging the broadcast program groups comprises a plurality of categories, including genres, titles, channel names, casts of the broadcast programs and viewing records of the user regarding the broadcast programs, the rule is dynamically changed among the plurality of categories through a selection, and the broadcast program groups are changed and the program order is reordered when the selection is made according to a user input.

27. The apparatus of claim 15, wherein the selection unit selects, in response to a third input signal, a broadcast program included in a broadcast program group that precedes the current broadcast program group, and selects, in response to a fourth input signal, a broadcast program included in a broadcast program group that follows the current broadcast program group.

28. The method of claim 3, wherein the other rule includes whether the broadcast programs have been viewed or not viewed, and the one-dimensionally arranging comprises, in each of the section blocks representing the broadcast program groups, arranging the broadcast programs which have not been viewed to be adjacent to one another within the section block and arranging the broadcast programs which have been viewed to be adjacent to one another within the section block.

29. The method of claim 28, further comprising:

collecting viewing records of a viewer corresponding to the plurality of broadcast programs, the viewing records of the viewer including information indicating whether the viewer has viewed the broadcast programs, information indicating how long the viewer has viewed the broadcast programs, information indicating whether the viewer has recorded the broadcast programs, information indicating whether the viewer has reproduced the recorded broadcast programs, and information indicating whether the viewer switches channels while watching the broadcast programs;

analyzing user preference for each of the plurality of broadcast programs based on the viewing records, the user preference being proportional to a viewing time of the viewer corresponding to the each of the plurality of broadcast programs; and arranging the broadcast programs in each of the section blocks representing the broadcast program groups according to the analyzed user preference.

30. The non-transitory computer-readable recording medium of claim 14, wherein the classifying the plurality of broadcast programs comprises classifying the plurality of broadcast programs into a plurality of groups which are represented by section blocks in the program bar, the section blocks being interconnected with each other to form the program bar, and the one-dimensionally arranging comprises arranging the broadcast programs in the program order and arranging the broadcast program groups in the group order in the program bar, and, in each of the section blocks representing the broadcast program groups, arranging broadcast programs that share a same attribute to be adjacent to one another according to another rule, and the displaying comprises displaying the program bar in which broadcast programs having different attributes are visually differentiated.

31. The non-transitory computer-readable recording medium of claim 30, wherein the method further comprises:

collecting viewing records of a viewer corresponding to the plurality of broadcast programs, the viewing records of the viewer including information indicating whether the viewer has viewed the broadcast programs, information indicating how long the viewer has viewed the broadcast programs, information indicating whether the viewer has recorded the broadcast programs, information indicating whether the viewer has reproduced the recorded broadcast programs, and information indicating whether the viewer switches channels while watching the broadcast programs;

analyzing user preference for each of the plurality of broadcast programs based on the viewing records, the user preference being proportional to a viewing time of the viewer corresponding to the each of the plurality of broadcast programs; and arranging the broadcast programs in each of the section blocks representing the broadcast program groups according to the analyzed user preference.

32. The apparatus of claim 17, wherein the second rule includes whether the broadcast programs have been viewed or not viewed, and the arrangement unit arranges in the program bar, in each of the section blocks representing the broadcast program groups, the broadcast programs which have not been viewed to be adjacent to one another within the section block and arranging the broadcast programs which have been viewed to be adjacent to one another within the section block.

33. The apparatus of claim 32, further comprising a user preference analysis unit which collects viewing records of a viewer corresponding to the plurality of broadcast programs and analyzes user preference for each of the plurality of broadcast programs based on the collected viewing records, wherein the viewing records of the viewer includes information indicating whether the viewer has viewed the broadcast programs, information indicating how long the viewer has viewed the broadcast programs, information indicating whether the viewer has recorded the broadcast programs, information indicating whether the viewer has reproduced the recorded broadcast programs, and information indicating whether the viewer switches channels while watching the broadcast programs, and wherein the user preference is proportional to a viewing time of the viewer corresponding to the each of the plurality of broadcast programs, wherein the arrangement unit arranges the broadcast programs in each in each of the section blocks representing the broadcast program groups according to the analyzed user preference.

34. The method of claim 1, wherein the broadcast programs are simultaneously and independently represented, visually, in a selectable manner at a plurality of continuous adjoining locations located throughout an entire length of the displayed single program bar.

35. The method of claim 1, wherein the displayed single program bar does not display detailed information regarding the broadcast programs.

36. The method of claim 2, further comprising sequentially selecting the current broadcast program among the broadcast programs by moving the displayed indicator along the displayed single program bar between the first and second ends of the displayed single program bar.

37. The non-transitory computer-readable recording medium of claim 14, wherein the broadcast programs are simultaneously and independently represented, visually, in a selectable manner at a plurality of continuous adjoining locations located throughout an entire length of the displayed single program bar.

38. The non-transitory computer-readable recording medium of claim 14, wherein the displayed single program bar does not display detailed information regarding the broadcast programs.

39. The apparatus of claim 15, wherein the broadcast programs are simultaneously and independently represented, visually, in a selectable manner at a plurality of continuous adjoining locations located throughout an entire length of the displayed single program bar.

40. The apparatus of claim 15, wherein the displayed single program bar does not display detailed information regarding the broadcast programs.

41. The apparatus of claim 16, wherein the selection unit sequentially selects the current broadcast program among the broadcast programs by moving the displayed indicator along the displayed single program bar between the first and second ends of the displayed single program bar.

\* \* \* \* \*